United States Patent [19]
Konno et al.

[11] 4,410,782
[45] Oct. 18, 1983

[54] SPOT WELDING APPARATUS

[75] Inventors: Mitsuo Konno, Kawagoe; Ryo Niikawa, Sayama; Kenzo Sato, Hidaka, all of Japan

[73] Assignee: Honda Giken Kogyo Kabushiki Kaisha, Tokyo, Japan

[21] Appl. No.: 200,580

[22] Filed: Feb. 20, 1981

[51] Int. Cl.³ .............................................. B23K 11/10
[52] U.S. Cl. .................................... 219/89; 219/86.25
[58] Field of Search ................................ 219/89, 86.25

[56] References Cited
U.S. PATENT DOCUMENTS

| | | | |
|---|---|---|---|
| 3,008,034 | 11/1961 | Wolfbauer | 219/89 |
| 3,299,247 | 1/1967 | Waltonen | 219/89 |

Primary Examiner—Elliot A. Goldberg
Attorney, Agent, or Firm—Armstrong, Nikaido, Marmelstein & Kubovcik

[57] ABSTRACT

A fluid pressure operated spot welding apparatus is disclosed, in which one of a pair of electrode arms initially is moved from a closed position of the electrodes in a rectilinear path perpendicular to the other electrode, and subsequently is swung in an arcuate path to a retracted position in which the said one electrode is positioned rearwardly and remote from the said other electrode, the apparatus also providing for the substitution of alternative workpiece supports in a readily interchangeable manner.

6 Claims, 8 Drawing Figures

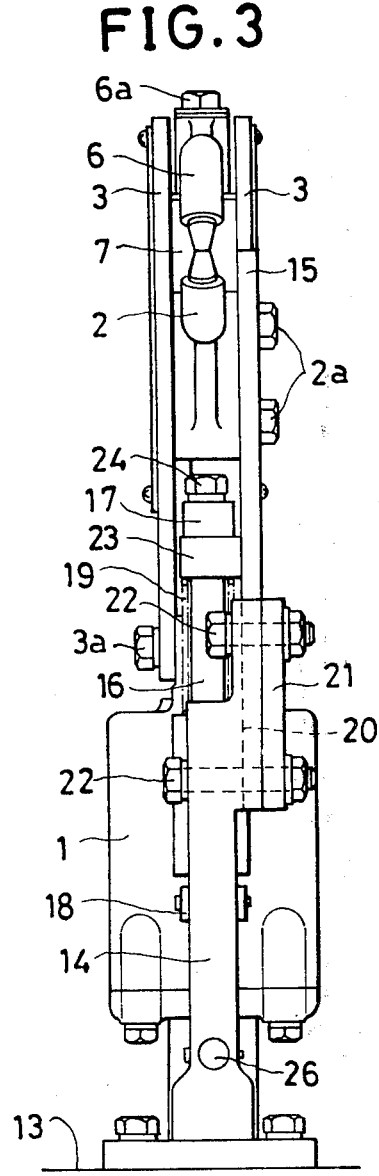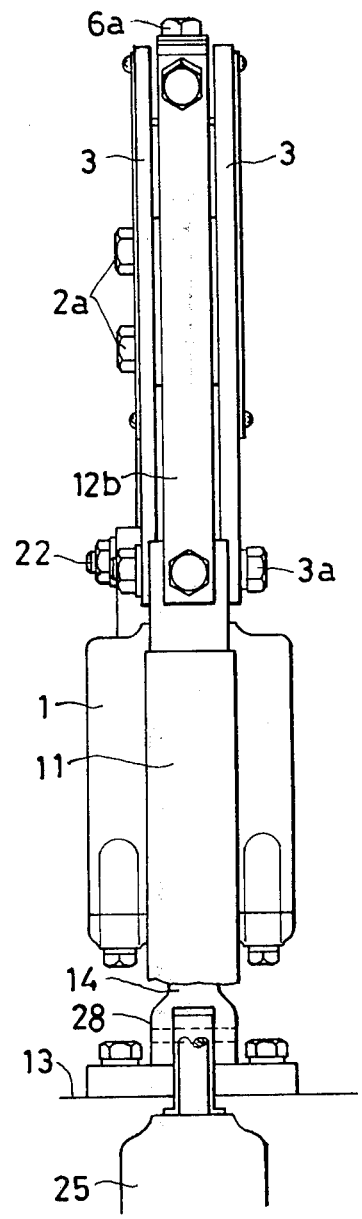

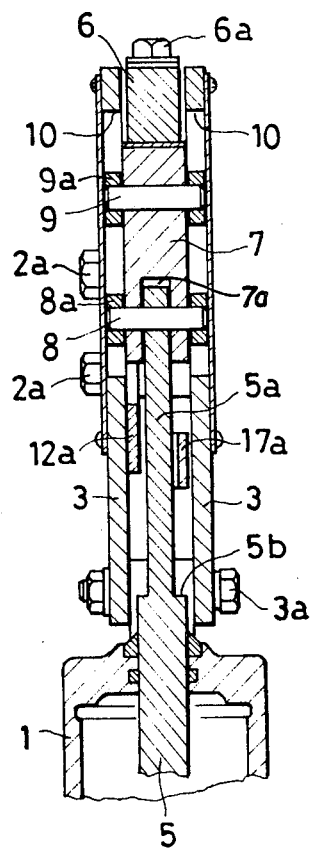
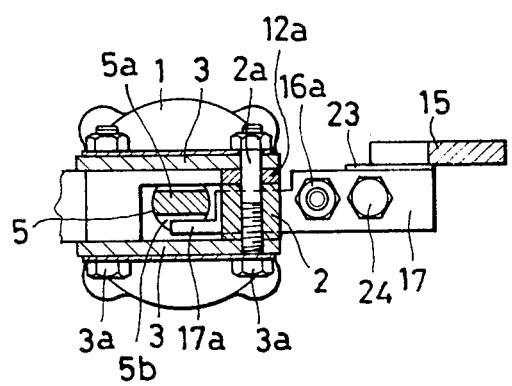
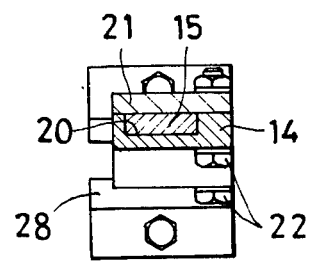

4,410,782

SPOT WELDING APPARATUS

FIELD OF THE INVENTION

This invention relates to a spot welding apparatus of the type including welding electrodes which are moved into clamping engagement with a workpiece prior to establishment of an electric current across the electrodes to produce an electrical resistance weld in the workpiece, and, in particular relates to an apparatus of this type which is rigidly supported by a workbench or similar support structure.

BACKGROUND OF THE INVENTION

Commonly known forms of apparatus of this type incorporate a fixed lower electrode, and an upper electrode which is movable either in a vertical direction, or which is pivoted about a fixed horizontally arranged axis for it to swing vertically about the radius of the pivot. In such known forms of apparatus, access of the workpiece to the nip of the electrodes is limited to movement of the workpiece in a generally horizontal direction into the nip of the electrodes, with the possibility of the workpiece impacting on one or other of the electrodes, with consequential damage to the electrodes.

In an attempt to provide more ready access of the workpiece to the nip of the electrodes, it has been proposed to support the upper electrode on a linkage which includes dual horizontally arranged pivots in order to increase the opening of the nip, and thus increase accessability of the workpiece to the nip.

Such a structure is, however, cumbersome, complicated and large in size, and consequently is expensive to manufacture. Additionally, in prolonged use, difficulty is experienced in ensuring the perfect alignment of the axis of the respective electrodes upon closing of the nip, the tendancy being for the movable upper electrode to move or wander laterally due to wear in the linkage and the bearings thereof, such that the axis of the upper electrode may be of set laterally to the axis of the fixed electrode, with consequent imperfections in the spot weld formed in the workpiece.

OBJECT OF THE INVENTION

An object of the present invention is to provide a spot welding apparatus in which the movable upper electrode is retracted upon opening of the electrodes to an extent sufficient to permit access of the workpiece to the apparatus not only in a generally horizontal direction, but, also in a generally vertical and downward direction onto the workpiece support, thus providing ready and convenient access of the workpiece into proper positioning relatively to the nip of the electrodes, while reducing or eliminating the probability of damage to the electrodes due to inadvertent impact thereon by the workpiece.

BRIEF DESCRIPTION OF THE INVENTION

According to the present invention, the upper electrode is supported for movement not only in a rectilinear direction generally perpendicular to the lower electrode on closing or opening of the nip of the electrodes, but additionally, is supported for movement in an arcuate path into a retracted position subsequent to the completion of said rectilinear movement in an opening direction, whereby the upper electrode, when in a fully retracted position, is positioned upwardly and laterally of the lower electrode, thus providing a widely open jaw for the entry of a workpiece.

BRIEF DESCRIPTION OF THE DRAWINGS

A preferred form of apparatus according to the present invention will now be described with reference to the accompanying drawings, in which:

FIG. 3 is a front view of the apparatus when in the closed position shown in FIG. 2;

FIG. 4 is a rear view of the apparatus, when in the closed position illustrated in FIG. 2;

FIGS. 5, 6 and 7 are sectional views taken along the lines V—V, VI—VI and VII—VII in FIG. 2.

DESCRIPTION OF THE INVENTION WITH REFERENCE TO THE DRAWINGS

Figure 1:
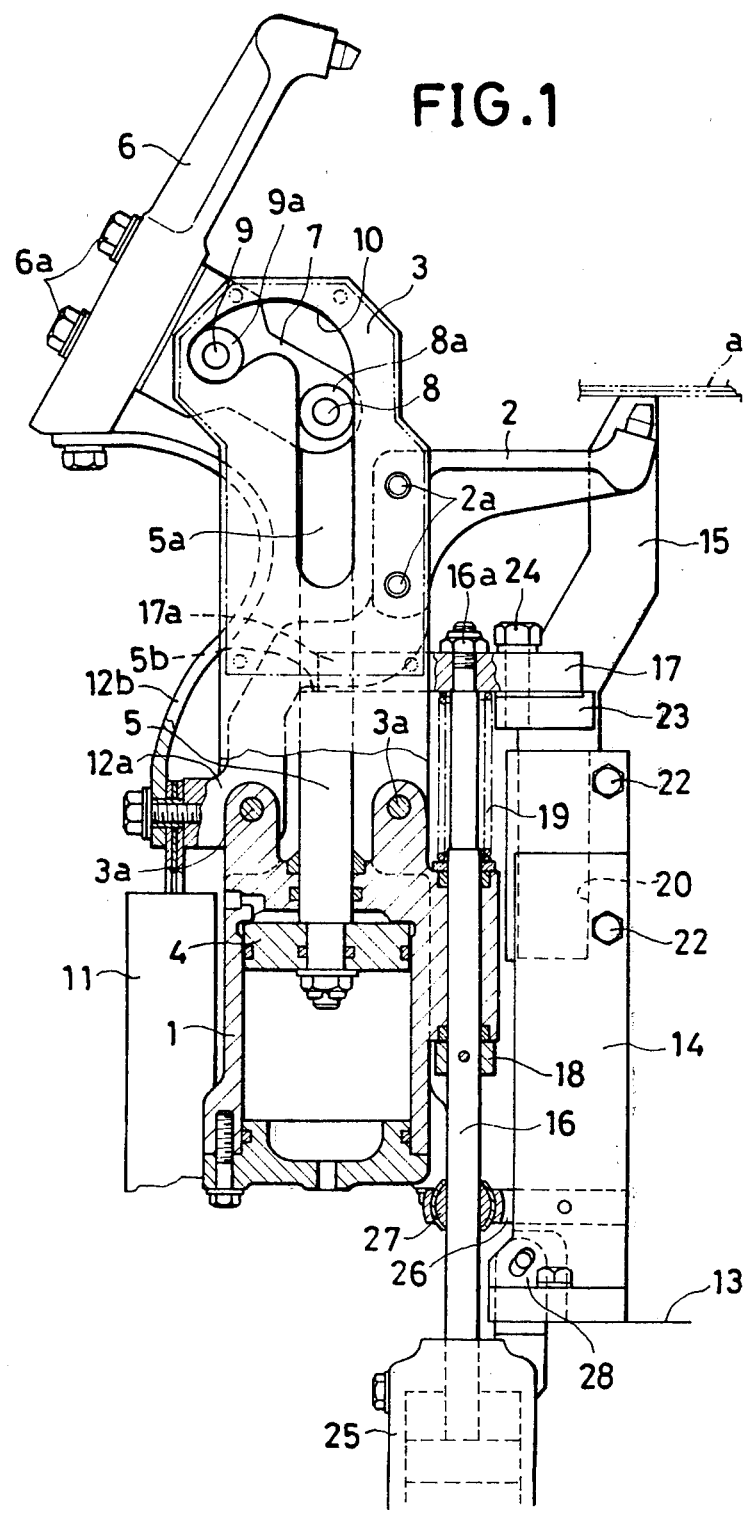
FIG. 1 is a side view, partly in section, showing the apparatus in an open position preparatory to the insertion of a workpiece.

The apparatus of the invention includes a piston and cylinder arrangement 1, which includes a piston 4 slidable within the cylinder, the piston 4 being attached to a piston rod 5 which extends upwardly in a generally vertical direction, the piston rod at its upper end, and as illustrated more clearly in FIGS. 5 and 6, being formed with parallel flat side surfaces, which provide a radial abutment surface 5b at the transition between the cylindrical portion of the piston rod 5 and the flattened portion 5a thereof.

Integral with the upper surface of the cylinder 1 is a pair of lugs having aligned, parallel side faces which provide abutments for the lower ends of a pair of parallelly spaced cam plates 3, the cam plates being secured to the lugs by nuts and bolts 3a.

Positioned upwardly of the lugs is a lower welding electrode 2, which is rigidly secured to the cam plates 3 by bolts 2a, the electrode 2 extending laterally and forwardly of the cam plates 3.

An upper welding electrode 6 is secured by means of bolts 6a to a carriage 7 which is positioned between the cam plates 3, and which has parallel flat side surfaces as more clearly illustrated in FIG. 5. Extending from each planar side face of the carriage is a pair of pins 8, 9, each of which carries an anti-friction roller 8a, 9a. The respective rollers are received within cam tracks 10 formed in the respective cam plates 3, the cam tracks 10 each including a substantially vertical, rectilinear, lower portion which continues at its upper end into an arcuate second portion which extends laterally of the length of the first portion in generally L-shaped relationship.

The upper end of the piston rod 5a is received within a slot 7a in the carriage and, pivotally is attached to the carriage 7 by means of the pin 9a, which, as illustrated in FIG. 5, passes through the upper end of the piston rod 5a, and also through the carriage 7. The rollers 8a and 9a are held against displacement axially of their supporting pins 8 and 9 by side plates attached to the respective cam plates 3, the side plates being illustrated in FIGS. 5 and 8, and, for the purpose of clarity, being shown in chain-dotted lines in FIGS. 1 and 2.

The required electrical connections to the lower and upper electrodes 2, 6 from a kickless supply cable 11 are provided by a supply plate 12a which is in electrical communication with the lower electrode 2, and a flexible or resilient strip 12b which is connected to the upper electrode 6. Conveniently, the upper electrode 6 is electrically isolated from the cam plates 3 and thus from the lower electrode 2 by forming the carriage 7 from an electrically insulating material, such as a thermo hardening resin or other heat resistant synthetic plastics material.

The assembly so far described and which includes the piston and cylinder arrangement, the cam plates, the welding electrodes, and the carriage comprise a unitary subassembly, which may be supported in any convenient manner, depending upon the particular use required of the apparatus.

According to the preferred embodiment of the present invention, the aforementioned sub-assembly is supported from a work table or machine base 13 by a stanchion 14 which is bolted or otherwise rigidly secured to the base 13 in the manner illustrated. At its upper end, the stanchion 14 has a lateral extension, more clearly illustrated in FIG. 3, to which a workpiece support 15 is clamped by means of a clamping plate 21 and bolts 22. The workpiece support extends in an upward generally vertical direction, and, terminates at its upper end at a position spaced upwardly to a small extent from the lower electrode 2. The workpiece support carries a lateral extension 23, to which an abutment member 17 is detachably secured by means of bolts 24. The abutment member 17 extends inwardly of the spaced cam plates 3, and terminates at its inner end, as more clearly illustrated in FIG. 6, in the path of movement of the abutment surface 5b of the piston rod 5 for a purpose later to be explained.

Rigidly secured to the abutment member 17 by nuts 16a is a guide member 16 in the form of a cylinderical shaft, which, as later explained, is the piston rod of a second piston and cylinder arrangement 25. The piston and cylinder arrangement 1 is slidably supported on the shaft 16, and is movable vertically thereof against the bias of a spring 19, the spring 19 at all times acting to urge the piston and cylinder arrangement 1 downwardly into engagement with a stop member 18 rigidly carried by the shaft 16.

Towards its lower end, and for a purpose later to be described, the shaft 16 is pivotally supported in a gimbal bearing 27, the bearing 27 being supported from the stanchion 14 by a lateral arm 26. Also for a purpose later to be described, the cylinder of the piston and cylinder arrangement 25 is loosely supported from the stanchion 14 by a pin and slot arrangement 28, the pin being carried by a lug fast with the cylinder 25 and which extends through slots in the side walls of a recessed lower portion of the stanchion 14.

MODE OF OPERATION

Figure 2:
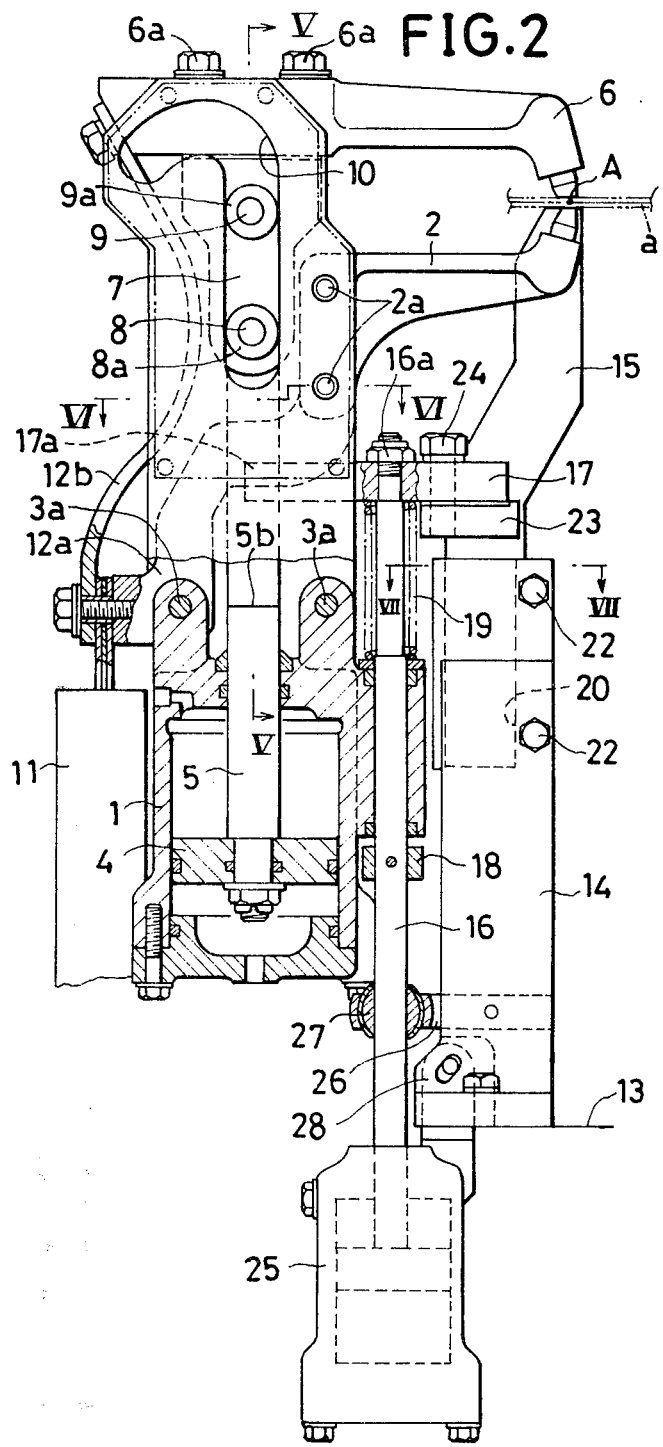
FIG. 2 is a side view, partly in section, showing the apparatus in a closed operative position for effecting a weld in a workpiece.

Commencing with the apparatus in the position shown in FIG. 1 of the drawings, upon the supply of compressed air or hydraulic fluid to the upper end of the cylinder 1, fluid pressure is applied against the upper surface of the piston 4 to force the piston downwardly in the cylinder. In moving downwardly, the piston 4 carries with it the piston rod 5, which in turn applies a downward force to the pin 8, and thus to the carriage 7.

By virtue of the inclined position of the carriage 7, the downward force exerted on the pin 8 is resolved as a downward movement of the pin 8 and an arcuate movement of the pin 9, the roller 9a at this time rolling in the arcuate portion of the cam slot 10. This downward movement of the pin 8, in conjunction with the configuration of the arcuate portion of the cam track produces a rapid arcuate movement of the carriage 7, and with it the upper electrode 6 to very quickly swing the upper electrode 6 from its inclined upwardly extending position as shown in FIG. 1 to a generally horizontal position, the rollers 9a during this movement travelling from the remote end of the arcuate portion of the cam track into the upper end of the vertical rectilinear portion thereof.

At this time, the upper electrode 6 is in a generally horizontal attitude spaced upwardly of the lower electrode 2 with the respective electrodes aligned vertically relatively to each other. Continued downward movement of the piston rod 5 causes both rollers 8a and 9a to progress downwardly within the rectilinear portion of the cam track, thus moving the then horizontally exposed upper electrode 6 in a downward direction perpendicular to the lower electrode 2, until such time as the upper electrode 6 contacts the workpiece, the workpiece then preventing further downward movement of the upper electrode 6.

With the continued supply of fluid pressure to the cylinder, the cylinder itself rises on the shaft 16 against the bias of the spring 19 to move the entire sub-assembly upwardly to bring the lower electrode 2 into contact with the lower surface of the workpiece. At this point, with the electrodes clamped against the workpiece, which is schematically illustrated at a in the drawings, the required electrical potential is applied across the electrodes 2 and 6 to effect a spot welding operation.

Once the spot welding operation has been completed, the flow of fluid pressure to the cylinder 1 is reversed for pressure to be applied against the lower face of the piston 4, at which time the cylinder 1 travels downwardly on the shaft 16 assisted by the bias of the spring 19, until such time as it comes into contact with the stop member 18. Continued supply of fluid pressure to the lower end of the cylinder 1 causes the piston 4 to rise, and with it the piston rod 5, the piston rod 5 applying an upward force to the carriage 7, causing the carriage to move upwardly in generally horizontal orientation until such time as the rollers 9a enter the arcuate portions of the cam tracks 10. Continued upward movement of the piston rod 5 then results in rapid arcuate movement of the upper electrode 6 to its initial position as shown in FIG. 1.

There is the possibility that one or other of the electrodes will adhere to the workpiece during the spot welding operation, a problem which is particularly troublesome in prior art devices. The apparatus of the present application overcomes that problem in its entirety by providing a force to break the surface adhesion of either one of the electrodes with the workpiece. If it should be that the lower electrode 2 has adhered to the workpiece, the cylinder 1 will be held by the lower electrode 2 against downward movement into engagement with the stop 18. However, at this time continuing upward movement of the piston rod 5 will bring the abutment surface 5b into engagement with the abutment member 17, thus preventing continued upward movement of the piston rod 5, and in turn applying the entire force of the fluid pressure to the cylinder to force it downwardly and thus break the adhesion of the lower electrode 2 with the workpiece. Once the adhesion has been broken, the cylinder 1 moves downwardly in a usual manner under the assist of the spring 19 into engagement with the stop member 18. If it is the upper electrode 6 which has adhered to the workpiece, the cylinder 1 and with it the lower electrode 2 and the cam plates 3 will move downwardly until such time as the cylinder engages the stop member 18, subsequent to which upward movement of the piston rod 5 will apply the required force to the upper electrode 6 to break the adhesion.

As will be appreciated from the foregoing description, by the present invention there is provided a spot welding apparatus in which the upper electrode, in addition to being withdrawn from the lower electrode in a generally vertical direction, such as is known in the art, is subsequently swung through a wide angle for it to be displaced laterally away from the lower electrode to a convenient position in which the jaw of the apparatus is completely open, thus permitting the workpiece to be placed on the workpiece support by moving the workpiece in a downward direction onto the work piece support, without any fear of damaging either of the electrodes by the impact thereon of the workpiece. Such downward movement of the workpiece freely into engagement with the workpiece support is inhibited in prior art arrangements owing to the fact that the upper electrode either is in spaced overlying relationship with the lower electrode, thus requiring insertion of the workpiece into the nip of the electrodes in a horizontal direction, or, if pivoted for swinging movement, the upper electrode still extends angularly over the lower electrode, increasing the possibility of damage to the upper electrode by impact thereon by the workpiece.

The apparatus of the present invention provides free and unrestricted access to the workpiece support by the workpiece, either by moving the workpiece in a generally vertical downward direction onto the workpiece support, or in a generally horizontal direction onto the workpiece support, or, a combination of such movements, without any substantial risk of impecting the workpiece on either of the electrodes.

Figure 8:
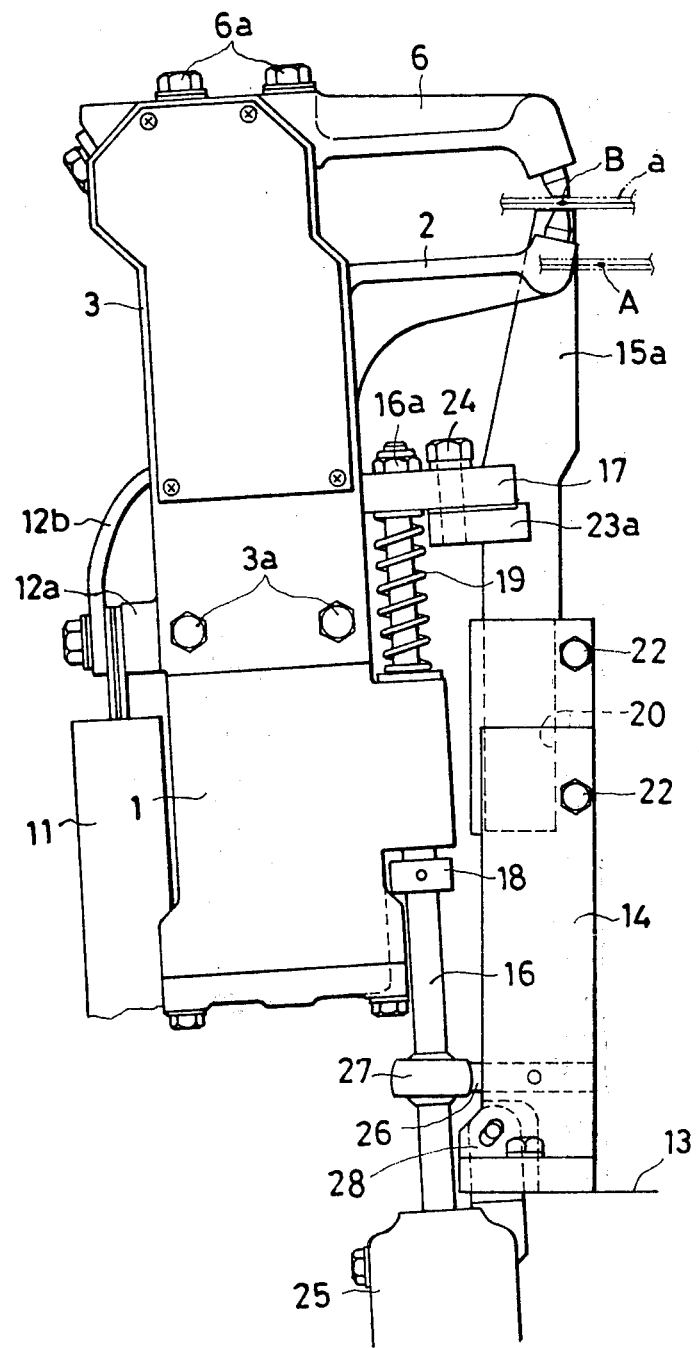
FIG. 8 is a side view of the apparatus in the position shown in FIG. 2, in which a workpiece support of the apparatus has been replaced by a workpiece support of a different form to the one shown in FIG. 2.

As will be readily apparent, the occasion may arise that the workpiece support 15 illustrated in FIGS. 1 through 7 will need to be replaced by a workpiece support of different dimensions or configuration, such as the workpiece support 15a illustrated in FIG. 8. It will be noted that in FIG. 8 the position of the spot weld A has been moved from the location illustrated in FIGS. 1 through 7 to the location B.

In order to substitute the alternative workpiece support 15a for the original workpiece support 15, the bolt 24 is removed, and, pressure fluid is supplied to the piston and cylinder arrangement 25 causing the shaft or piston rod 16 to rise in the gimbal bearing 27, thus raising the entire sub-assembly off the lateral extension 23, and, permitting lateral swinging of the sub-assembly to the extent permitted by the pin and slot connection of the piston and cylinder arrangement 25 with the stanchion 14. The bolts 22 are then slackened, and the workpiece support 15 is then removed and replaced by the alternative workpiece support 15a. The bolts 22 are again tightened to lock the alternative workpiece support 15a to the stanchion, subsequent to which the supply of pressure fluid to the cylinder 25 is reversed. This causes a downward movement of the sub-assembly to bring the abutment member 17 thereof into position on the lateral support 23a of the alternative support member 15a, subsequent to which the bolt 24 is tightened down to lock the abutment member 17 to the support member 23a.

While the invention has been described with reference to a preferred embodiment thereof, it will be readily apparent that changes may be made therein without departing from the scope of the invention as defined by the following claims.

We claim:

1. A spot welding apparatus, comprising;
   a stanchion adapted to be secured to a support surface;
   a workpiece support carried by the stanchion;
   a fluid-operated piston and cylinder arrangement supported from said stanchion; spaced parallel cam plates carried by said cylinder, each of which includes a generally L-shaped cam track;
   a fixed electrode carried by said cam plates;
   a movable electrode having spaced laterally extending pins slidably received within a cam track of the respective cam plates; and an interconnection between said movable electrode and and said piston and cylinder arrangement for moving said electrode under the control of said cam tracks.

2. A spot welding apparatus including:
   spaced parallel cam plates, said cam plates each including a cam track having a first portion of rectilinear form and a second portion which is a continuation of said first portion and which extends transversely of the length of said first portion in generally L-shaped relationship;
   a fixed welding electrode rigidly supported by said cam plates;
   a moveable electrode supported for movement relatively to said cam plates, said moveable electrode including a carriage received between said cam plates and having faces extending parallel to said cam plates, and paired spaced cam followers carried by each of said faces and which are positioned with the cam track of the juxtaposed cam plates; and
   drive means connected to said carriage and which is operative to move said carriage from a first, open position of the electrodes in which the respective pairs of cam followers are located with one cam follower of each pair positioned in said first cam track portion and the other cam follower of each pair positioned in said second cam track portion, to a second, closed position of the electrodes in which both cam followers of each pair are positioned in said first cam track portion, said drive means comprising:
   a fluid operated piston and cylinder assembly including a cylinder body, a piston reciprocatable within said cylinder body, and a piston rod secured to said piston and extending through an end wall of said cylinder;
   said cam plates being secured to said cylinder body and respectively extending parallel to said piston rod with said first cam track portion extending parallel to said piston and, said piston rod being pivotally interconnected with said carriage, and
   guide means supporting said cylinder body for movement in a direction axially of said piston rod, a stop member limiting movement of said cylinder body in one direction corresponding with said open position of said electrodes, and resilient means biasing said cylinder body into engagement with said stop member.

3. The spot welding apparatus of claim 2, further including;
a workpiece support associated with said guide means, an abutment surface associated with said piston rod, and an abutment member associated with said workpiece support which extends into the path of movement of said abutment surface and which is engaged by said abutment surface during the movement of said piston rod in said one direction.

4. The spot welding apparatus of claim 3, further including;
a stanchion adapted to be secured to a supporting surface and which detachably supports said workpiece support.

5. The spot welding apparatus of claim 3, in which; said abutment member is carried by said guide means and is detachable from said workpiece support, further including a second piston and cylinder arrangement which is associated with said guide means for moving said guide means, and with it said abutment member and said stop member for said piston and cylinder arrangement, in a direction axially of said piston rod.

6. The spot welding apparatus of claim 5, in which said guide means is a piston rod of said second piston and cylinder arrangement, the cylinder of said second piston and cylinder arrangement being pivotally supported on said stanchion for swinging movement about a gimbal bearing surrounding of said piston rod of the second piston and cylinder arrangement, said piston rod being extendable from said cylinder to raise said stop member.

* * * * *